(12) United States Patent
Wildsmith et al.

(10) Patent No.: US 12,388,849 B2
(45) Date of Patent: Aug. 12, 2025

(54) ONLINE CODE SIMILARITY AND MALICIOUSNESS SEARCHING USING A VECTOR DATABASE

(71) Applicant: Fortinet, Inc., Sunnyvale, CA (US)

(72) Inventors: Jeremy Allen Wildsmith, Burnaby (CA); Mounir Elgharabawy, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 159 days.

(21) Appl. No.: 18/375,518

(22) Filed: Sep. 30, 2023

(65) Prior Publication Data

US 2025/0112936 A1    Apr. 3, 2025

(51) Int. Cl.
| | | |
|---|---|---|
| G06F 15/16 | (2006.01) | |
| G06F 9/54 | (2006.01) | |
| H04L 9/40 | (2022.01) | |
| H04L 29/06 | (2006.01) | |

(52) U.S. Cl.
CPC ................................ H04L 63/1416 (2013.01)

(58) Field of Classification Search
CPC .................................................. H04L 63/1416
USPC .......................................................... 726/23
See application file for complete search history.

(56) References Cited

U.S. PATENT DOCUMENTS

| | | | |
|---|---|---|---|
| 9,672,358 B1 * | 6/2017 | Long ..................... | G06F 21/565 |
| 10,592,667 B1 * | 3/2020 | Long ..................... | G06F 21/565 |
| 11,373,065 B2 * | 6/2022 | Davis ................... | G06F 18/2135 |
| 2017/0063892 A1 * | 3/2017 | Bartos ................. | H04L 63/1425 |
| 2022/0019665 A1 * | 1/2022 | Perry ...................... | G06F 21/10 |
| 2023/0385416 A1 * | 11/2023 | Vasilenko ............. | G06F 16/285 |

FOREIGN PATENT DOCUMENTS

WO     WO-2018115534 A1 *   6/2018   ............. G06F 21/56

* cited by examiner

*Primary Examiner* — Hamza N Algibhah
(74) *Attorney, Agent, or Firm* — Law Office of Dorian Cartwright; Dorian Cartwright

(57) ABSTRACT

Techniques relate generally to computer networks, and more specifically, for a web browser having a web browser extension for evaluating web requests using internal coordination to make asynchronous information synchronously available, prior to dispatching the web requests.

3 Claims, 8 Drawing Sheets

ONLINE CODE SIMILARITY AND MALICIOUSNESS SEARCHING USING A VECTOR DATABASE

FIELD OF THE INVENTION

The invention relates generally to computer networks, and more specifically, for a web browser having a web browser extension for evaluating web requests using internal coordination to make asynchronous information synchronously available, prior to dispatching the web requests.

BACKGROUND

A brief survey reveals that a common existing approach for embedding code for similarity searching is to use the Control-Flow Graph as a source for vector embedding. In the referenced research [1], the control-flow graph is augmented with features of contained code to generate graphs that sufficiently capture code semantics. Finally, a Graph Embedding Network is trained and applied to the augmented control-flow graph to produce a vector embedding.

A brief comparison between the referenced approach of using control-flow graphs as the source for code similarity searching versus using data-flow graphs is presented below:

Control-Flow Graphs are structurally not unique and do not contain much information.

Consider the Control-Flow Graph in FIG. 2, which captures the control-flow semantics of three very behaviorally different code segments. Comparably, the data-flow semantics shown in FIG. 3 visually illustrates the very pronounced structural difference in the data-flow semantics.

Control-Flow Semantics do not reveal very much detail about a given code-segment.

Small to medium code-segments will have essentially indistinguishable control-flow semantics and are generally an amalgamation of common control-flow constructs produced by compilers. These control-flow patterns hide important details, such as how underlying data is used.

On the contrary, data-flow semantics are generally much more revealing and structurally unique and model how data is used due to these patterns. For example, they can reveal the general density of information being produced or used Control-Flow is easily modified and not durable to the consequence of compiling, obfuscation, or deobfuscation steps.

By incorporating a code-deobfuscating compiler in our approach we are able to overcome differences in similar code-segments produced either explicitly by obfuscation or incidentally by differences in compiler behaviors that might otherwise obfuscate possible similarities between code-segments.

By leveraging data-flow graphs in our work and applying connectivity-based clustering on the data-flow graphs, we can derive meaningful relationships between how data is used in the code, which is a much deeper analysis than leveraging the control-flow graph of the code.

SUMMARY

To meet the above-described needs with methods, computer program products, and systems. In one embodiment, a method performs the steps of:

generating a knowledge base of known malicious code in vector objects representing at least a segment of code, wherein a distance between vector objects is calculated by Euclidean distances;

receiving a PE binary sample to test from a remote network device;

selecting one or more segments of the PE binary sample for analysis;

converting the one or more segments of the PE binary sample to one or more test vector objects, wherein comprising:

generating a data flow graph from the PE binary sample using the deobf compiler;

applying Markov clustering on the data flow graph to generate one or more clusters;

for each cluster retrieve features into a weighted vector;

generating a feature matrix from the weighted vector of PE binary sample, wherein the feature matrix comprises for each Markov cluster, weighting cluster by relative size;

embedding the feature matrix;

training an IsoMap dimensionality reduction model;

performing code similarity detection by searching the knowledge database for known vector objects by matching the one or more test vector objects within a threshold; and responsive to a match, taking a security action.

DETAILED DESCRIPTION

Figure 1:
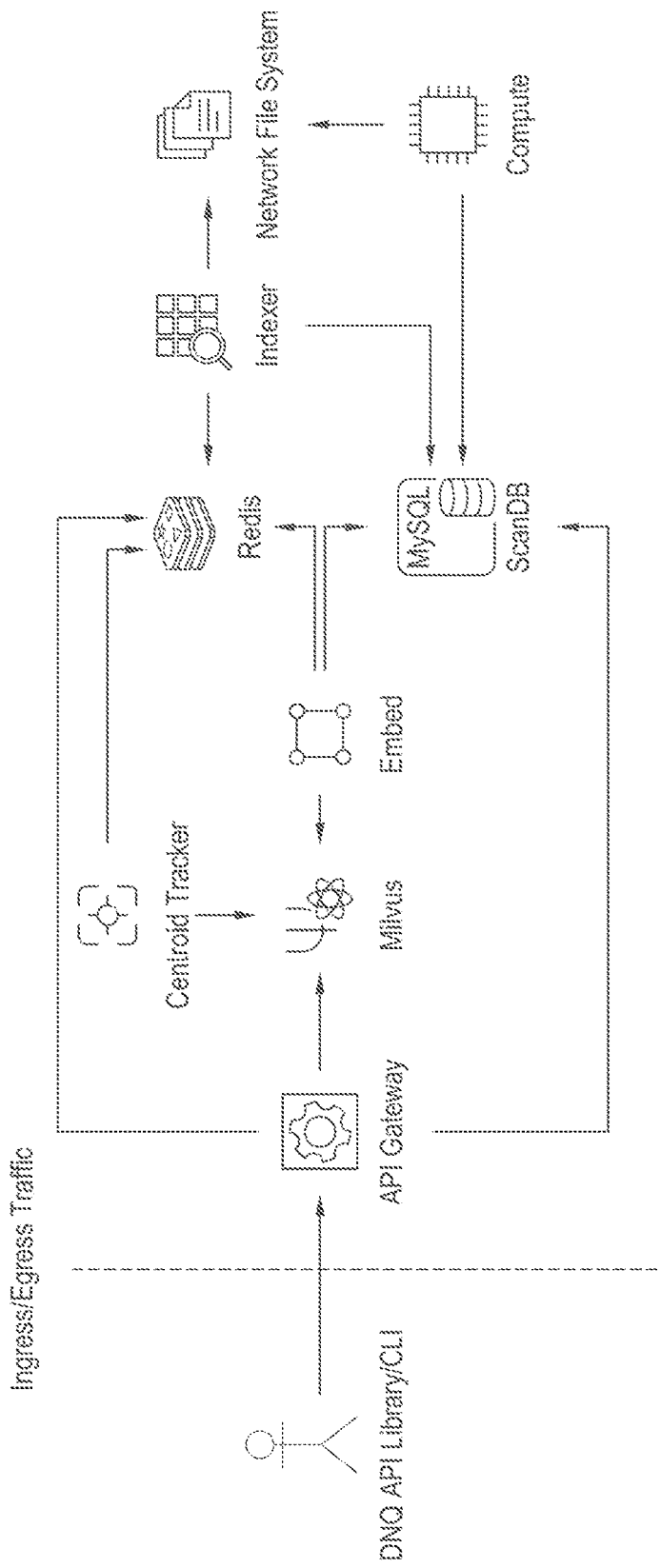
FIG. 1 illustrates a system overview.
Figure 2:
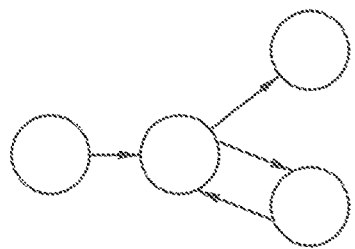
FIG. 2 illustrates a control-flow graph for three very different code segments.
Figure 3:
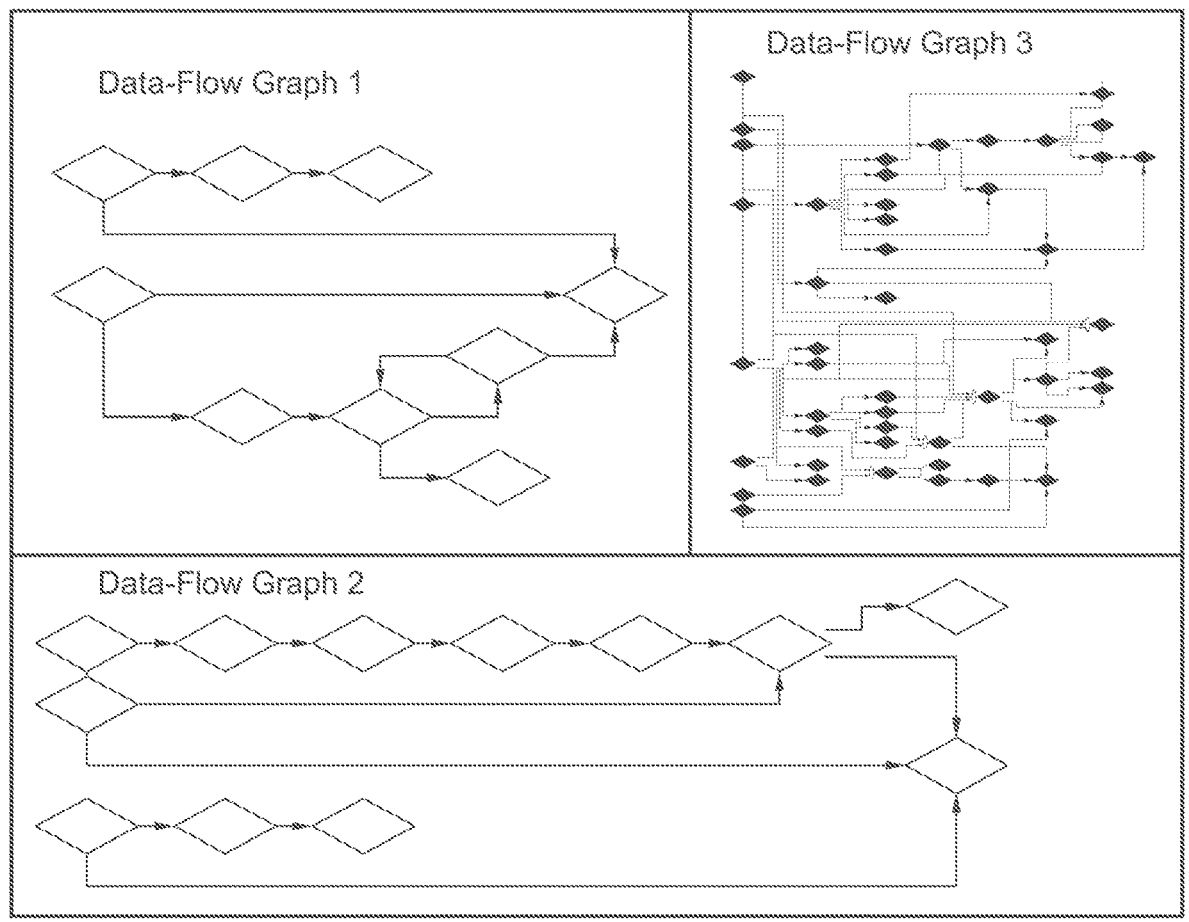
FIG. 3 illustrates three distinct data-flow graphs for three different code segments having identical control-flow semantics.

Methods, computer program products, and systems for evaluating web requests in an extension of a web browser using asynchronous information services, prior to dispatching the web requests for a network device.

The disclosed technique solved the stated problem [4.1] by first extracting the data-flow graph from the Static Single-Assignment Intermediate Representation code (SSA-IR) generated by a Code Deobfuscating Compiler (note that the Code Deobfuscatng Compiler is not the subject of this patent but the use of produced Data-Flow Graphs are). The Code Deobfuscating Compiler is configured to optimize/simplify the code and transform it as closely as possible to a canonical form before having the data-flow graphs for the subject code generated; this helps to satisfy the requirement that the ultimate result is durable [4.1.c]. The extracted data-flow graph is an object which uniquely identifies the originating code [4.1.a]. However, this data-flow graph is inefficient to compare against directly; therefore, further steps are necessary to produce an object satisfying good comparability properties [4.1.b].

The produced data-flow graph undergoes a post-processing step, which applies a clustering operation on the data-flow graph (this clustering isolates and defines significant data-flow code features, which helps to satisfy the durability of the object to irrelevant variations [4.1.c]) and via various processes, produces a multi-dimensional vector embedding. This vector embedding captures the semantics [4.1.a] of the originating code, is durable to irrelevant variations [4.1.c], and is easily comparable [4.1.b].

The technique solves the related problem of querying, construction, and persistence of the knowledge base [4.2, 4.3], a database of vector embedding objects & associated meta-data, by implementing a set of microservices, which orchestrate the populating, and searching of the knowledge base. These microservices orchestrate the following:

Streaming binary samples into a pipeline to process them and generate said objects [4.1]

Persisting objects & related meta-data into a vector & relational database, forming the knowledge base Providing an interface to search the knowledge base (backed by relational and vector database) for related code using a code-segment as input Providing a system to derive, from discovered relationships in the database, a maliciousness confidence score The maliciousness score [4.4] is produced by extracting a set of one or more code-segments for a subject PE Binary sample and applying a classification step to classify the individual code-segments into respective discovered categories, and then score the code-segments by their relationship with known malicious samples and finally weight them to their most related cluster. A net maliciousness score is produced after weighing the individual functions respective to their classification.

Important Features which are New and Important

The fundamental piece of the invention that is novel is the following:

[4.1] The pipeline which leverages a code deobfuscating compiler to translate code into a "canonical form" and extract data-flow graphs & translate these graphs into a vector embedding for use in code similarity searching.

[4.4] The processes to translate discovered relationships between a test sample and code-segments in the knowledge-base into a maliciousness score for the sample All other solved problems of this invention [4.2, 4.3] facilitate leveraging these core feature as a means for code similarity searching and malware detection.

These core features are part of the System Overview outlined in & related to the rest of the system in Section 6.

INTRODUCTION

To describe the invention in detail, we first start with describing the processes which solve the stated problems of 4.2 and 4.3 and then later describe in detail how the problems 4.1 and 4.4 are solved. This provides a top-down view of the invention. Please note supplemental report provided as attachment (dnq_report.pdf)

System Architecture (4.2 and 4.3)

The System Overview Diagram (FIG. 1) presents a visual representation of the architecture for the DNQ system, which facilitates the systems and processes which address the challenge of 4.2 and 4.3 of the invention (incorporates processes that solve problems 4.1 and 4.4.) The diagram visually represents the relationship between these components in a system with the arrows pointing from the service where querying originates to the service being queried.

For a brief description of each service and general purpose served by the service, refer to Table 1.

All DNQ services are deployed, orchestrated and managed by Kubernetes and Helm and are hosted in a server-side Kubernetes cluster managed by Fortinet in a lab environment. The DNQ API Library/Client executes outside of the Kubernetes environment and directly on the client machine. Services are naturally scaled horizontally to increase processing throughput by the system.

In the DNQ System, following services are proprietary, and developed and maintained internally:

DNQ API Library/CLI

API Gateway

ScanDB (Backed by a MySql Relational Database [https://www.mysql.com/], but database application consisting of SQL stored procedures and schema is proprietary)

Embed

Indexer

Compute

Centroid Tracker

The following are incorporated 3rd Party Services:

NFS (Network File System) https://en.wikipedia.org/wiki/Network File System

Redis https://redis.com/

Milvus https://milvus.io/

For the purposes of this patent, the core generation of object from code [4.1] is implemented as a part of compute (generation of data-flow graphs and feature matrices) and embed (vector embedding processes) components. The processes for detection [4.4] are implemented partially in the Centroid Tracker, API Gateway and the DNQ API Library/CLI.

Use Cases

Once the system is active & deployed, from an administration and user perspective, the system has the following main use-cases which are explained individually to document how the system works. These Use Cases are referred to throughout this document as Use Case A, Use Case B and Use Case C respectively:

Updating the knowledge with new data-sets

Assigning or updating detection characteristics for samples in the knowledge-base Querying the knowledge for similarity & maliciousness Each use-case begins by interacting with the API Gateway through the client-side DNQ API Library or CLI Application. Between the DNQ API/CLI & the DNQ API Gateway, the remainder of the services presented are orchestrated accordingly to achieve the desired task.

Use Case A: Updating the Knowledge with New Data-Sets

In this use case, the user is updating the system knowledge to provide the system data-points, which can later be searched for, related to or compared against in a query (Use Case C)

This Use Case involves the following steps by the user:

Upload the PE Binary File onto the Network File System

Communicate to the API Gateway to consume sample into the knowledge base.

A sample can be assigned a detection (Use Case B) at any time, even if it is absent from the system, partially processed or fully processed. See section Use Case B for more details of detection assignment.

After the user has communicate to the API Gateway that the sample is to be processed, it cascades into the following workflows of processing (which are bootstrapped by the API Gateway but not fully orchestrated by the API Gateway)

Sample Staging (Sequence Diagram: FIG. 11)

Figure 10:
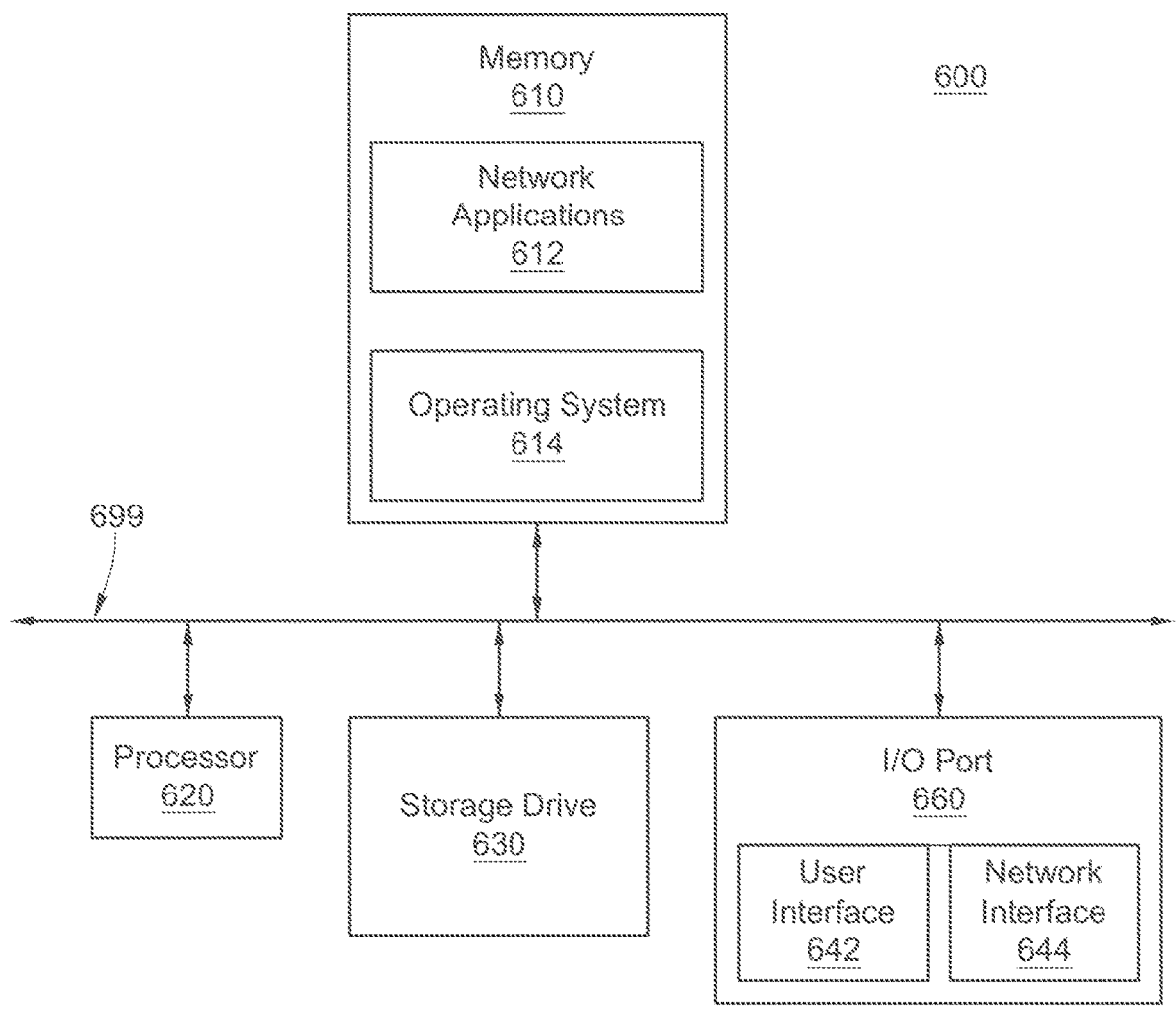
FIG. 10 illustrates a computing device.

Sample Indexing (Sequence Diagram: FIG. 10)

Figure 8:
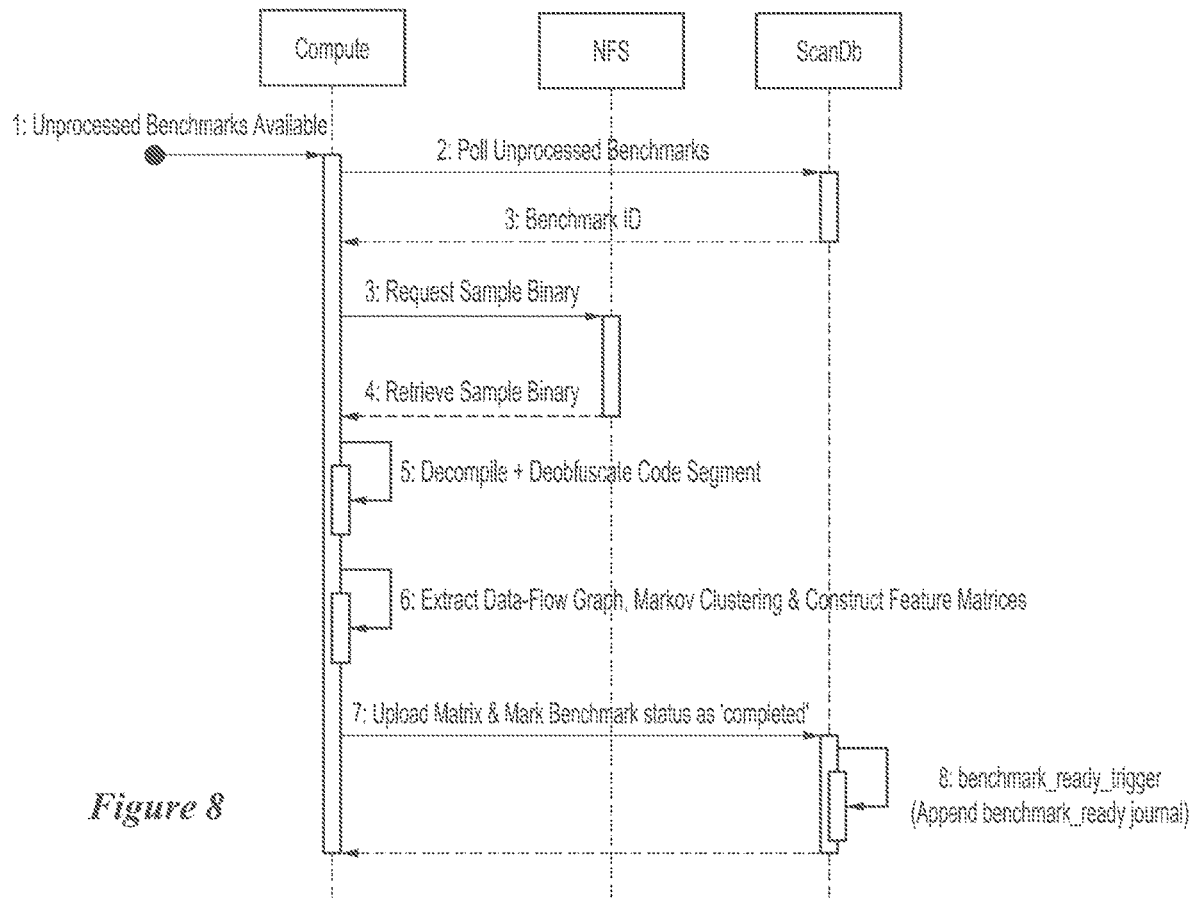
FIG. 8 illustrates feature extraction.

Feature Extraction (Sequence Diagram: FIG. 8)

Figure 9:
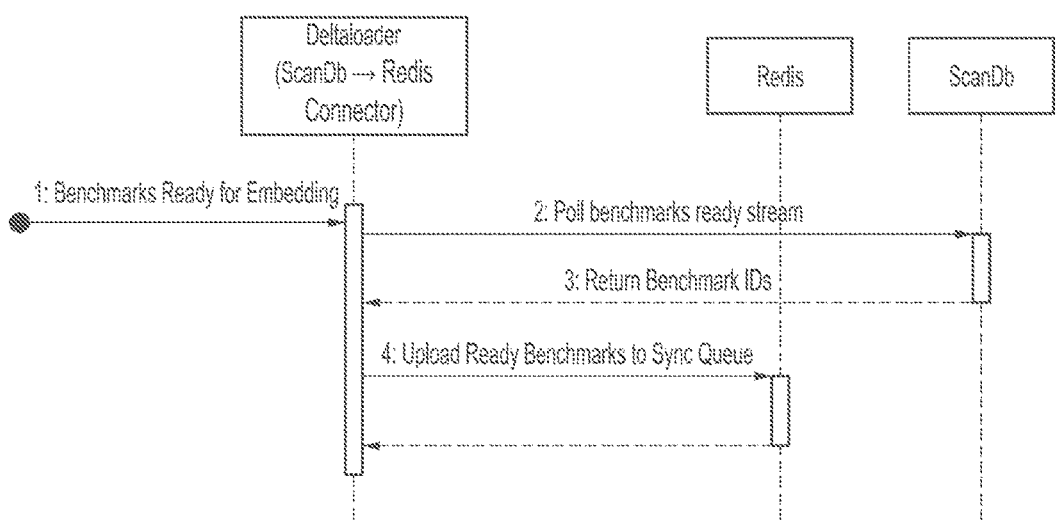
FIG. 9 illustrates feature staging.

Feature Staging (Sequence Diagram: FIG. 9)

Figure 6:
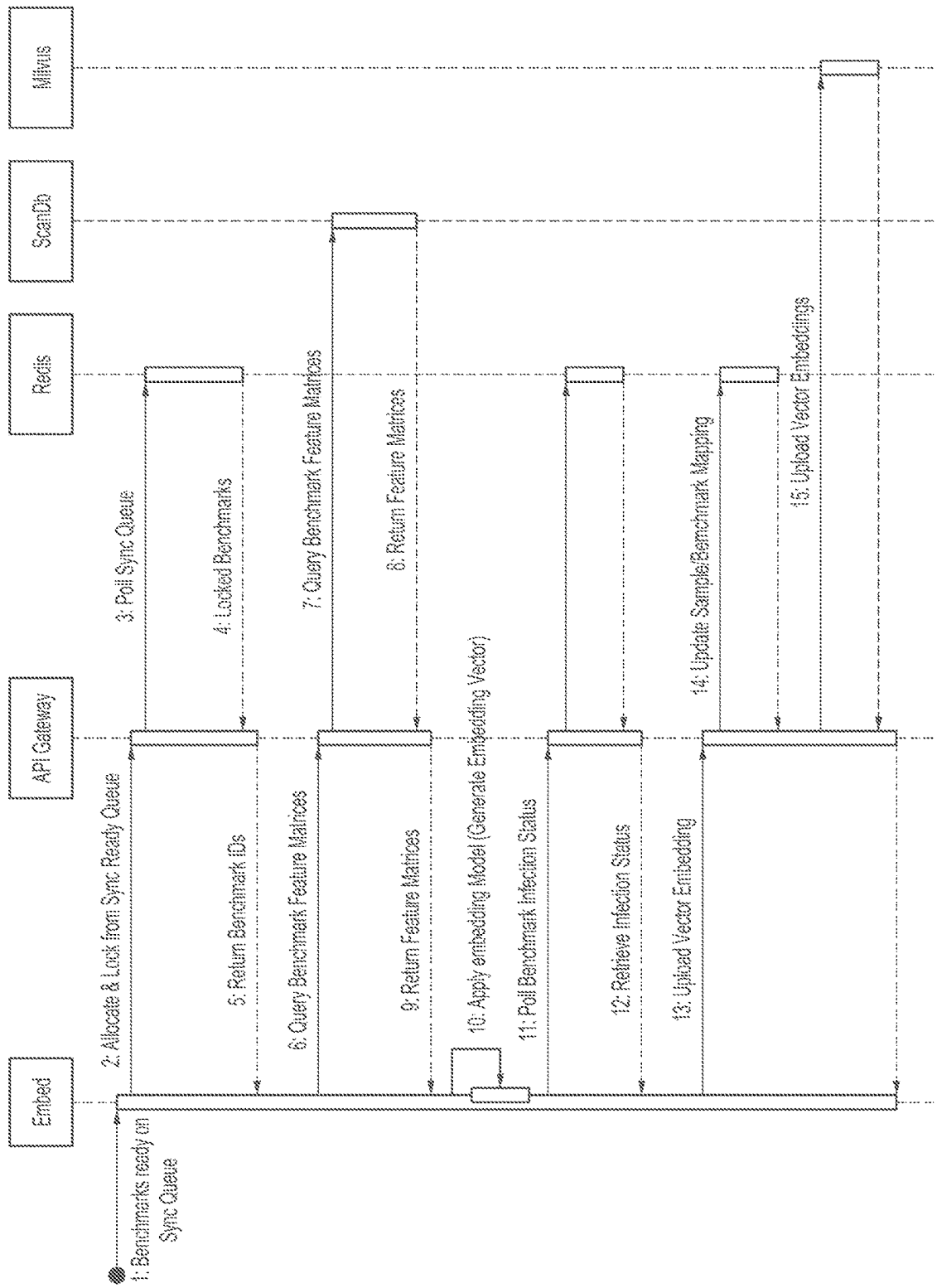
FIG. 6 illustrates DNQ embedding process.

Feature Embedding (Sequence Diagram: FIG. 6)

These workflows are executed by a composition of difference services in the DNQ System and are connected using queues. See Table 2 for a detailed description of each workflow.

The process is summarized below:

Sample Staging

The user uploads the PE Binary File to the NFS. This makes the binary accessible for processing by the services (Compute & Indexers) responsible for processing the raw binary file.

Using the API Gateway, the Sample is Queued for Processing

The API Gateway adds the sample to a Redis Sample Queue, which is regularly polled by the Indexer services Sample Indexing The Indexer polls the Redis Sample Queue for the name of Samples on the NFS to be processed.

Once an entry in the queue is collected, the Indexer accesses the sample via the shared NFS The indexer internally executes a query against the raw code in the PE Binary Sample to heuristically identify significant code segments that should be added to the knowledge base.

The indexer uploads one or more location descriptors to the ScanDB which can be used to locate the selected code segments.

Feature Extraction (FIG. 13)

The Compute service regularly polls the ScanDb for new location descriptors (ScanDB Benchmark) that have yet to be processed (produced by Sample Indexing)

Once a single location descriptor (Benchmark) is polled from the ScanDb, the respective descriptor is locked (ie MySQL Record is updated to be place into a processing state) such that it cannot be allocated by a different Compute instance.

The compute service uses the location descriptor to collect the respective PE Binary for the NFS File System The compute service uses the location descriptor to identify the Code Segment in the PE Binary and pass this to the Code Deobfuscating Compiler which will deobfuscate/optimize the code segment into a proprietary canonical Static Single Assignment form Intermediate Representation (SSA-IR).

Using the SSA-IR, a Directed Data-Flow Graph is Derived

Markov clustering is performed on the produced Data-Flow Graph & a feature-matrix is generated The Feature Matrix is uploaded into the ScanDb and the respective record in the Database for the Location Descriptor/Benchmark is placed in a completed state with the produced feature matrix associated respectively.

Internally, the ScanDb has a trigger which appends the completed benchmarks to a benchmark_ready table maintained within the ScanDb.

The benchmark_ready table serves as a journal for benchmarks being processed & ready. This journal is automatically maintained by triggers in the ScanDB as Benchmarks have their status updated & feature matrices associated. In addition, subsequent Feature Staging tracks the journal (with state information in the Redis Database) to ensure the Redis Sync Queue is populated as the journal is updated.

Feature Staging

Regularly translates new entries (Benchmark IDs) from the benchmark_ready journal onto the Redis Sync Queue Feature Embedding The embed instance regularly polls the Redis Sync Queue Once one or more entries (Benchmark IDs) are collected off of the Redis Sync Queue, their respective Feature Matrices are queried from the ScanDB The Feature Matrices are applied against the trained scaler and IsoMap embedding model to produce one or more Vectors (each associated to a single Benchmark ID where the respective Feature Matrice originated.)

For each generated Vector, the originating sample's malicious label is collected from Redis and assigned to the vector (if no malicious label has been assigned, it defaults to neutral.)

The vector is uploaded in the Milvus Database, with the associated infection label and Benchmark ID. The Benchmark ID also serves as the Vector's Vector ID in the database.

The Vector ID is mapped to the sample in the Redis Database, such that Vectors in the Milvus Database for a given sample can efficiently be queried for future operations.

Use Case B: Assigning or Updating Detection Characteristics for Samples in the Knowledge-Base.

In this use case of DNQ, the user updates the malicious label for a sample in the knowledge-base to one of infected, clean or neutral. These labels are used when DNQ is Queried against with a Test Sample for a maliciousness score (Use Case C) and gives the detection algorithm sufficient context to reconcile similarity information discovered between the Test Sample and Knowledge Base into a maliciousness score.

Figure 7:
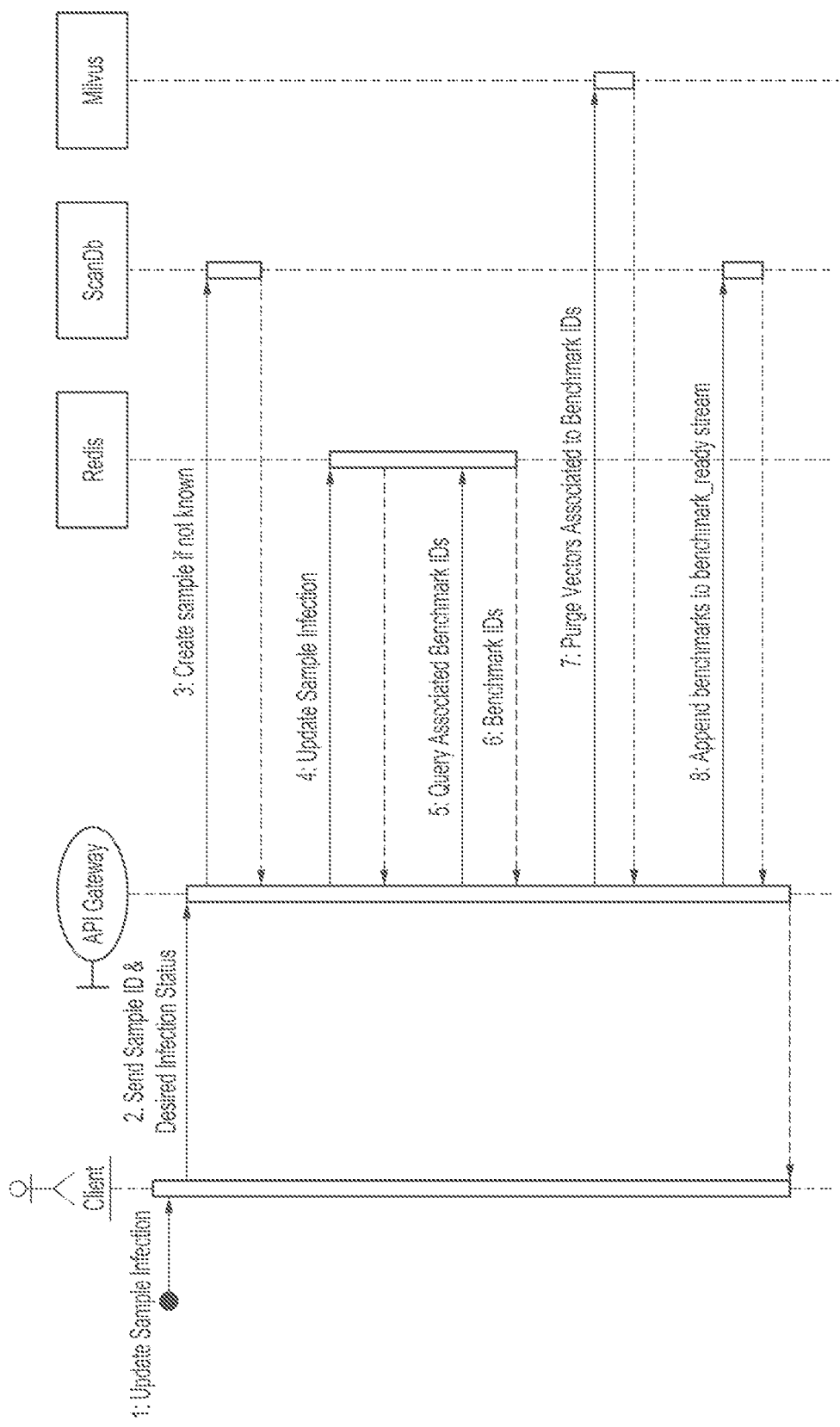
FIG. 7 illustrates detection updating.

In this use-case, the API Gateway performs the following sequence:
   Detection Updating (Sequence Diagram: FIG. 7)
   Feature Staging (Sequence Diagram: FIG. 9)
   Feature Embedding (Sequence Diagram: FIG. 6)
   Feature Staging and Feature Embedding work identical to Use Case A, and therefore will not be covered in this section.

Detection Updating
   User provides to API Gateway the sample name & desired malicious label
   The ScanDB is updated to include a record for this sample if it is not yet known
   The infection label for this sample is updated in Redis
   The set of Vector IDs/Benchmark IDs for the specified sample are queried from Redis
   The Milvus Database is purged of all Vectors with an ID within the retrieved Vector ID set
   The associated Benchmark IDs are re-placed onto the benchmark_ready journal.

Once the Benchmark IDs are placed onto the benchmark_ready journal, Feature Staging and Feature Embedding flows are naturally invoked similarly to what was described in Use Case A. This ultimately cascades the new malicious label into the Milvus Vector Database.

Use Case C: Querying the Knowledge for Similarity & Maliciousness.

In this use case, the user is leveraging the system to determine whether a Test Sample is related to any code within the DNQ knowledge base.

All searches in the DNQ System first derive a set of search vectors from the Test Sample and then search the Milvus Vector space to locate similar samples in the knowledge base by using the distance functions (Euclidean distance) between the vectors. This process is described in dnq_report.pdf (Section 4). Two vectors are considered to collide if they fall within a distance threshold (which is determined after training and analyzing the IsoMap Dimensionality Reduction model.

The DNQ System can be queried using PE Binary Samples as a search key (known as the 'Test Sample') remotely and locally.

For local and remote querying, there are pros and cons for each.

Figure 4:
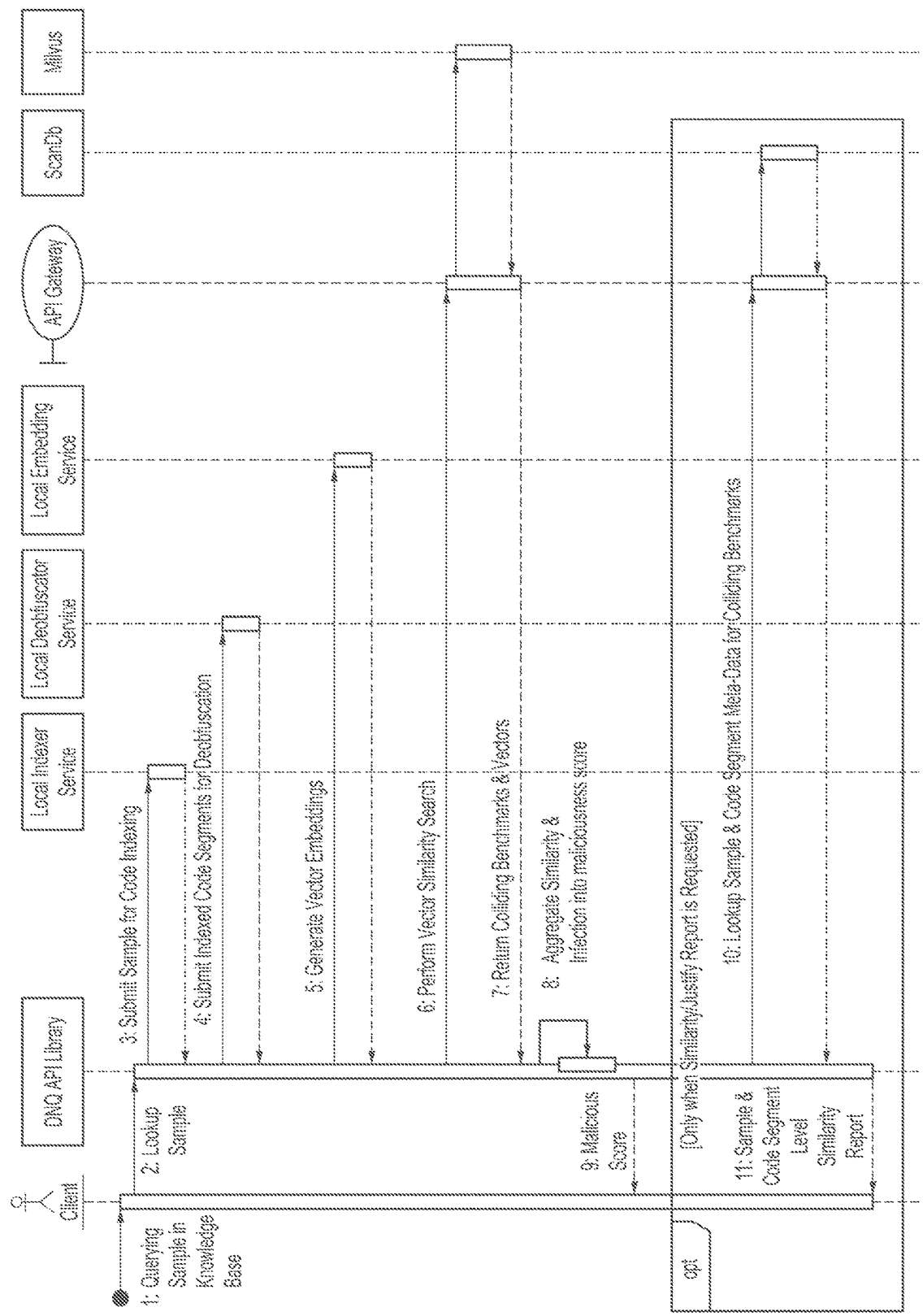
FIG. 4 illustrates local DNQ querying.
Figure 5:
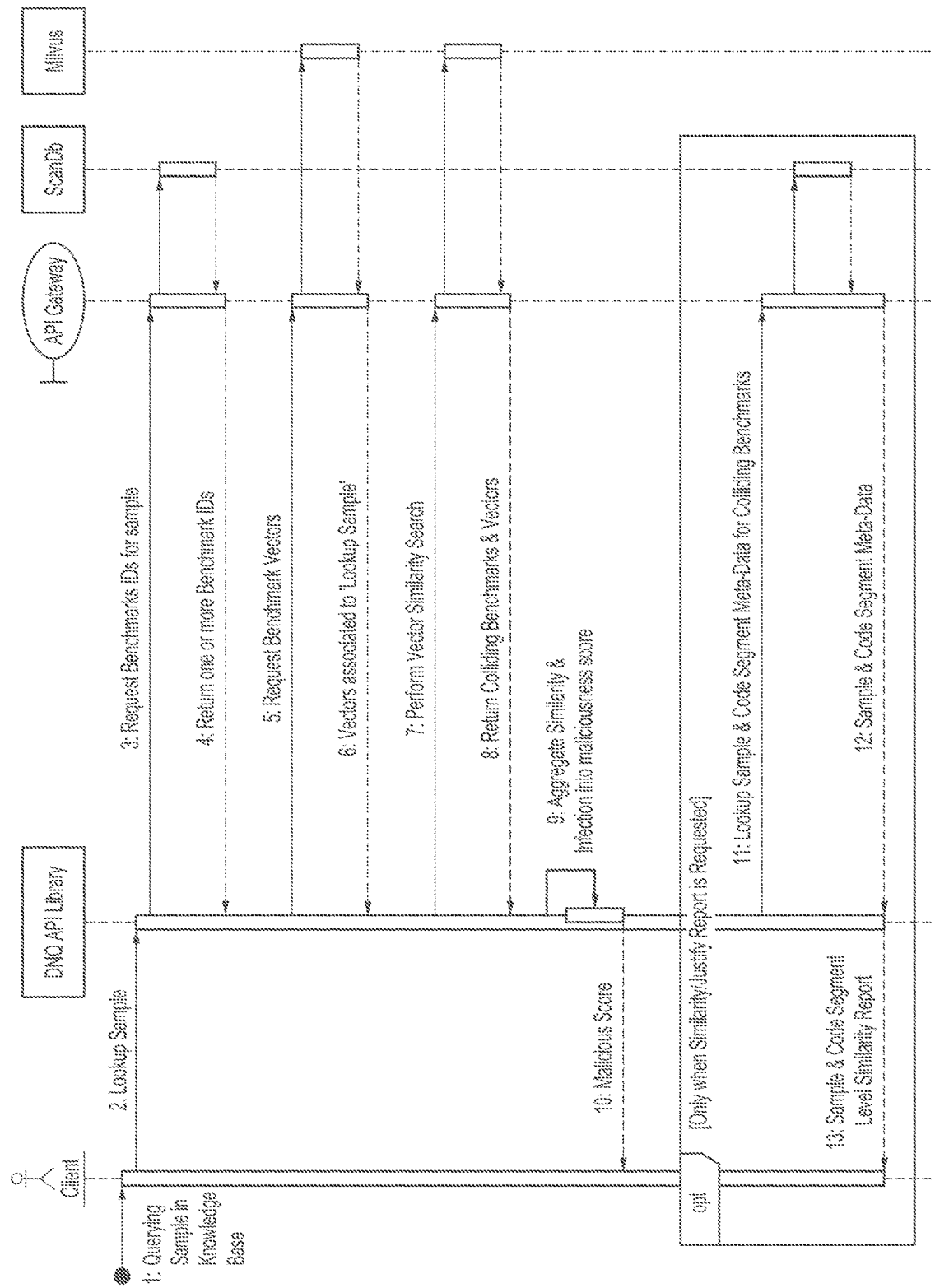
FIG. 5 illustrates remote DNQ querying.

Local Querying:
Advantages:
  The test sample does not need to leave the local system (security, privacy etc restrictions).
Disadvantages:
  Requires sufficient hardware resource allocation on the local system to process the sample
  Significant pieces of intellectual property are stored on the local system for processing
  Possible licensing constraints with distributing systems
Remote Querying:
Advantages:
  Can scale using cloud resources
  No significant Intellectual Property stored on client machine
  More flexible licensing requirements for processes incorporated by Code Deobfuscating Compiler, Indexer or other services.
Disadvantages:
  The test sample needs to be made available to the DNQ Services.
We outline the processes for querying remotely and locally below:
  Remote Querying (Sequence Diagram: FIG. 5):
  First the user uploads the Binary per Use Case A
  The user Queries the Sample in the Knowledge Base (Start of Sequence Diagram)
  The user initiates a Sample Lookup against with the DNQ API Library or CLI.
  The associated Benchmark IDs & Vectors for the sample are retrieved and searched against the Milvus Vector Database through the API Gateway.
  The API Gateway returns colliding Vectors, associated Benchmarks & infection label. For each vector, the API Gateway also returns the assigned cluster and cluster meta-data.
  The information received in prior step is aggregated into a malicious score.
  If a similarity report is also requested by the user, the meta-data associated to the colliding benchmarks is also queried and rendered to the user as a textual report.
Local Querying (Sequence Diagram: FIG. 4):
  The Binary PE Sample is executed against the Indexer (which executes on the local machine)
  The Indexer returns a descriptor describing selected code segments for analysis. These descriptors are forwarded to the Code Deobfuscating Compiler
  The Code Deobfuscating Compiler processes the selected Code Segments into SSA-IR & extracts the associated Data-Flow Graphs
  The Embedder applies Markov Clustering on the Data-Flow graph and applies the IsoMap embedding model
  The Vectors are searched against the API Gateway which returns the colliding (from the Knowledge-base) Vectors, associated Benchmarks & Infection label. For each vector, the API Gateway also returns the assigned cluster and cluster meta-data.
  The information received in prior step is aggregated into a malicious score
  If a similarity report is also requested by the user, the meta-data associated to the colliding benchmarks is also queried and rendered to the user as a textual report.
4.1: The Pipeline to Translate Code into a Vector Embedding for Use in Code Similarity Searching.
  The pipeline to translate code into a vector embedding consists of three main components:
    Generating the Feature Matrix (for the subject code-segment).
    Embedding the Feature Matrix (using a model prepared ahead of time offline)
    Training an IsoMap dimensionality reduction model (responsible for translating the feature matrix into the final embedding vector)
  Item #3 is done offline in a development environment with a large data-set of Feature Matrices. Item #1 and #2 are done as apart of the DNQ System online and as samples are processed.
Generating the Feature Matrix
  The entire process for generating the vector embedding starts in the Compute service (Feature Extraction workflow) where the selected code-segments for the selected binary samples (queued by the Indexer service [Sample Indexing workflow]) are passed through the Proprietary Code Deobfuscating Compiler to derive Data-Flow Graphs and ultimately feature matrices.
  In the attached dnq_report.pdf, Section 2.1 and Section 2.2 explains how the Code Deobfuscation Compiler generates data-flow graphs. Subsequently, Section 3.1 describes the process of generating the Feature Matrice from the data-flow graph. These two defined processes are replicated in the Compute service in steps 5 and 6 of the Feature Extraction workflow, respectively (see FIG. 8). Below, the process is re-iterated (see FIG. 12 for the flowchart):
    The pipeline consumes the selected Code Segment form the respective Binary File (indicated by the Benchmark/Location Descriptor which is collected off the queue in the Feature Extraction workflow)
    The binary blob/code-segment is forwarded into the Code Deobfuscating Compiler which deobfuscates/optimizes the code-segment and translates it into an SSA-IR form.
    A data-flow analysis is performed on the SSA-IR to produce a Data-Flow Graph
    Markov-Clustering is applied to the extracted Data-Flow Graph
    Features are collected from SSA-IR Instructions in each cluster thereby generating a feature vector for each cluster. Features collected included (as example):
    Amount of data (variables) that is both used and produced
    Density of conditional branching instructions in the cluster
    Density of non-trivial IR-Expressions (i.e. expressions of more than 2/3 terms)
    Amount of Runtime Interactions (i.e instantiating objects or invoking functions)
  Number of Function Arguments Referenced
  Number of Variables Referenced
    The feature vectors for each cluster are weighted respective to relative size of the cluster. As a collection of weighted cluster feature vectors, they ultimately form what is referred to as the Feature Matrix.
    The Feature Matrix (collection of weighted cluster vectors associated to the code-segment) is then uploaded into the ScanDB for further processing in the Feature Embedding workflow.
Embedding the Feature Matrix.
  After the feature matrices are prepared (and become available in the ScanDB), the feature matrices are picked up by the Embed service (Feature Embedding workflow) where they are embedded into vectors and uploaded into Milvus and finally become searchable (Use Case C.)

In this process, the following steps takes place:

The cluster feature vectors are flattened into a single column vector to produce a flattened image of the data-flow graph. This is achieved using pseudo-code described in Equation 1

This single flattened vector then undergoes a scaling and dimensionality reduction process where the trained Scaler and IsoMap dimensionality reduction models are applied to produce the final vector. This is achieved using the pseudo-code described in Equation 2

The final vector is then uploaded into the Milvus Database.

The process for generating the Vector Embedding is additionally described in the attached document (dnq_report.pdf) in Section 2 (Building Sample Abstraction) and Section 3 (Comparing Data-Flow Graphs).

Please note the following when reviewing associated documentation (dnq_report.pdf):

- Section 3.2 in dnq_report.pdf notes that Principal Component Analysis is used. In the current implementation, further research showed that ISOMap Dimensionality Reduction performed better and is used instead. Therefore, instead of using PCA, a ISOMap Model is fitted over a prepared data-set
- The embedding model requires unsupervised training before use in the system
- Data-Flow Graphs and Feature Matrices are produced by the compute service (seen in Table 1 and FIG. 1)
- Training an IsoMap dimensionality reduction model
- The IsoMap Dimensionality Reduction (and associated scaler model) is trained using the pseudo-code outlined in Equation 3. As input, the training process consumes an extensive collection of Feature Matrices. The embedding model training process is entirely unsupervised, though many Feature Matrices are required for a good distribution.

To evaluate the IsoMap Embedder and Scaler model, one can embed a test set of feature matrices for closely related and unrelated code-segments and assess whether the distances between these vectors reflect the observed similarity of the tested code-segments. Similar segments produce relatively close vectors, while dissimilar segments produce far-apart vectors.

Another way to evaluate the models is by plotting a histogram of the distances between all pairs of vector embeddings generated from a random distribution of code-segments. Again, most pairs will yield a dissimilar result, with some yielding very high similarity and some very low similarity. FIG. 13 shows a histogram with these features, with bucketed distances along the x-axis, and the number of vector pairs with a distance falling into the buckets along the y-axis.

4.4: The Processes to Translate Discovered Relationships into a Maliciousness Score for the Sample DNQ's architecture naturally lends itself to similarity-based malware detection in the case of a local query, without the client disclosing the queried sample itself. In Use Case 2, the discovered relationships between a queried sample's set of embedded vectors and the current knowledge base is returned to the client as collided vectors, clusters associated with the collided vectors, and cluster metadata. This information can be used to estimate a maliciousness score for the queried sample, based on its similarity with known malicious samples in the knowledge base.

In order to leverage the discovered relationships to estimate a maliciousness score, the cluster metadata includes (but is not limited to):

- The cluster's maliciousness density, defined as the number of vectors originating from a malicious sample divided by the total number of vectors belonging to the cluster
- The Cluster's Centroid For each vector ($V_i$), the distance ($D_i$) from the corresponding cluster's centroid ($C_i$) is calculated. It is possible to use any measure of distance (x) for this step, such as L1, L2, or cosine distance:

$$D_i = d_x(V_i, C_i)$$

The choice of distance measure is left up to the specific implementation. However, it can greatly affect the classification accuracy, and thus needs to be selected carefully against a validation set. A sample's final maliciousness score ($P_m$) is then estimated as the average of each collided cluster's maliciousness density ($M_i$), weighted by each vector's distance from the corresponding cluster's centroid ($D_i$). This can be expressed as the dot product of the malicious density vector (M) and the distance vector (D) divided by.

$$P_m = \frac{M \cdot D}{\|D\|_1}$$

Tables

TABLE 1

Description of DNQ Services

| Name | Description |
| --- | --- |
| DNQ-API/Client | The DNQ Command Line Interface/Library for interacting with and managing the DNQ system knowledge |
| API Gateway | A REST API endpoint for interacting with the DNQ System |
| Redis | A redis database, which is used to manage mostly state information for coordinating the DNQ services. In addition, for high-availability, the infection labeling of samples is stored in the redis database as well. |
| ScanDB | The knowledge base of the DNQ System. Where long-term information is persisted. An exception to this is that sample infection labeling is not persisted in the ScanDB and is apart of the Redis database. |
| Milvus | A vector database which represents the knowledge of the DNQ System in a easily searchable form. The milvus vectors also mirror the infection labeling from the redis database. |
| Embed | This service translates the knowledge of the ScanDB (generated feature matrices) into a searchable vector and upload this vector into the milvus database. |
| NFS | A standard network file system where DNQ is able to PE Binary Image associated to samples queued for processing. |

TABLE 1-continued

Description of DNQ Services

| Name | Description |
| --- | --- |
| Indexer | Instances of the .Net Feature Indexer. These execute graphql queries on the .Net binaries to identify significant code-segments of a sample and index them for future processing by compute instances. |
| Compute | A service which ultimately produces the feature matrices used later for Vector Embedding. This incorporates the proprietary Dot Net Code Deobfuscating Compiler for processing the code. |
| Centroid Tracker | Scheduled or Event Driven service which performs passive and periodic clustering of the vectors in the Milvus Vector Database to identify classifications of known code-segments in the knowledge base and update related classification meta-data (cluster centroids & weight) in Redis. This information is used later when applying a maliciousness score to samples. |

TABLE 2

DNQ Processing Workflows

| Name | Description |
| --- | --- |
| Sample Staging | In this workflow, the PE Binary Sample a user wants to queue for processing by the system is made available (on a shared Network Filesystem all services have access to.) Additionally, the user communicates to the DNQ System that it should process and include the analysis of this PE Binary Sample in the Knowledge Base for searching |
| Sample Indexing | The PE Binary Sample is decomposed into one or more code segments, which are addressed and placed into a Scan Database |
| Feature Extraction | The Scan Database is polled to collect one or more addressed code segments that should be processed and included in the Knowledge Base. The addressed code segments are retrieved and respective features extracted & placed into the Scan Database for further processing |
| Feature Staging | The extracted features are staged for embedding into the Milvus Vector Database |
| Feature Embedding | The staged features are collected & an embedding process is applied to translate the features into vectors which are then uploaded into the Milvus Vector Database where they finally become searchable by the systems and processes in DNQ |

III. Computing Device for a Web Browser Extension (FIG. 10)

FIG. 10 is a block diagram illustrating a computing device 600 for use in the system 100 of FIG. 1, according to one embodiment. The computing device 600 is a non-limiting example device for implementing each of the components of the system 100, including the station 110, the parking server 120 and the information server 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network device on a data communication network, for detecting malware from code vectors, the method comprising:
   generating a knowledge base of known malicious code in vector objects representing at least a segment of code, wherein a distance between vector objects is calculated by Euclidean distances;
   receiving a PE binary sample to test from a remote network device;
selecting one or more segments of the PE binary sample for analysis;
   converting the one or more segments of the PE binary sample to one or more test vector objects, wherein comprising:
   generating a data flow graph from the PE binary sample using a deobf compiler;
   applying Markov clustering on the data flow graph to generate one or more clusters;
for each cluster retrieve features into a weighted vector;
   generating a feature matrix from the weighted vector of PE binary sample, wherein the feature matrix comprises 40 of 42 for each Markov cluster, weighting cluster by relative size;
   embedding the feature matrix;
   training an IsoMap dimensionality reduction model;
   performing code similarity detection by searching the knowledge database for known vector objects by matching the one or more test vector objects within a threshold; and
   responsive to a match, taking a security action.

2. A non-transitory medium storing source code in a network device on a data communication network that, when executed by a processor, performs a method for detecting malware from code vectors, the method comprising:
   generating a knowledge base of known malicious code in vector objects representing at least a segment of code, wherein a distance between vector objects is calculated by Euclidean distances;
   receiving a PE binary sample to test from a remote network device;
   selecting one or more segments of the PE binary sample for analysis;

converting the one or more segments of the PE binary
sample to one or more test vector objects, wherein
comprising:
generating a data flow graph from the PE binary sample
using a deobf compiler;
applying Markov clustering on the data flow graph to
generate one or more clusters;
for each cluster retrieve features into a weighted vector;
generating a feature matrix from the weighted vector of
PE binary sample, wherein the feature matrix comprises for each Markov cluster, weighting cluster by
relative size;
embedding the feature matrix;
training an IsoMap dimensionality reduction model;
performing code similarity detection by searching the
knowledge database for known vector objects by
matching the one or more test vector objects within a
threshold; and
responsive to a match, taking a security action.

3. A network device, on a data communication network,
for detecting malware from code vectors, the network device
comprising:
a processor;
a network interface, communicatively coupled to the
processor and to the data communication network; and
a memory communicatively coupled to the processor,
wherein the processor executes source code, at least
partially stored in the memory, that:

generates a knowledge base of known malicious code
in vector objects representing at least a segment of
code, wherein a distance between vector objects is
calculated by Euclidean distances;
receives a PE binary sample to test from a remote
network device;
selects one or more segments of the PE binary sample
for analysis;
converts the one or more segments of the PE binary
sample to one or more test vector objects, wherein
comprising:
generates a data flow graph from the PE binary sample
using a deobf compiler;
applyies Markov clustering on the data flow graph to
generate one or more clusters;
for each cluster retrieves features into a weighted
vector;
generates a feature matrix from the weighted vector of
PE binary sample, wherein the feature matrix comprises for each Markov cluster, weighting cluster by
relative size;
embeds the feature matrix;
trains an IsoMap dimensionality reduction model;
performs code similarity detection by searching the
knowledge database for known vector objects by
matching the one or more test vector objects within
a threshold; and
responsive to a match, takes a security action.

* * * * *